US010938779B2

(12) United States Patent
Loyola et al.

(10) Patent No.: US 10,938,779 B2
(45) Date of Patent: Mar. 2, 2021

(54) GUIDED WORD ASSOCIATION BASED DOMAIN NAME DETECTION

(71) Applicant: INTERNATIONAL BUSINESS MACHINES CORPORATION, Armonk, NY (US)

(72) Inventors: Pablo Loyola, Tokyo (JP); Kugamoorthy Gajananan, Tokyo (JP); Yuji Watanabe, Tokyo (JP); Fumiko Akiyama, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/440,150

(22) Filed: Jun. 13, 2019

(65) Prior Publication Data

US 2020/0396204 A1 Dec. 17, 2020

(51) Int. Cl.
*H04L 29/12* (2006.01)
*G06F 16/955* (2019.01)
*G06F 16/951* (2019.01)

(52) U.S. Cl.
CPC .......... *H04L 61/302* (2013.01); *G06F 16/951* (2019.01); *G06F 16/9566* (2019.01); *H04L 61/1511* (2013.01); *H04L 61/303* (2013.01)

(58) Field of Classification Search
CPC . H04L 61/302; H04L 61/1511; H04L 61/303; G06F 16/9566; G06F 16/951
See application file for complete search history.

(56) References Cited

U.S. PATENT DOCUMENTS

| | | | | |
|---|---|---|---|---|
| 8,285,830 B1* | 10/2012 | Stout | ................... | H04L 63/1441 709/223 |
| 8,893,286 B1* | 11/2014 | Oliver | ..................... | G06F 21/64 726/26 |
| 10,491,614 B2* | 11/2019 | Grill | ................... | H04L 63/1441 |
| 2002/0099693 A1* | 7/2002 | Kofsky | ................ | G06F 16/955 |
| 2008/0250159 A1* | 10/2008 | Wang | ............... | H04L 29/12594 709/239 |

(Continued)

OTHER PUBLICATIONS

Fairwinds Partners, LLC., "Combosquatting—The Business of Cybersquatting, Part 3 of 3", Perspectives. vol. 3, Issue 9. Direct Navigation, Part 3 of 3. Nov. 6, 2008.

(Continued)

*Primary Examiner* — Mohamed A. Wasel
(74) *Attorney, Agent, or Firm* — Tutunjian & Bitetto, P.C.; Randall Bluestone (57) ABSTRACT

Guided word association based domain name detection may be performed by obtaining an original domain name, constructing a feature space from a corpus of text, wherein each word appearing in the corpus is represented as a vector in the feature space, detecting whether a domain name registration exists for each combination of the original domain name and each of a plurality of seed words from the feature space, determining, for each seed word included in an existing domain name registration, a plurality of nearest neighbor candidate words, based on vector distance in the feature space, and repeating, for one or more repetitions, the detecting and the determining, wherein the plurality of nearest neighbor candidate words are utilized as the plurality of seed words.

20 Claims, 6 Drawing Sheets

(56) References Cited

U.S. PATENT DOCUMENTS

| | | | |
|---|---|---|---|
| 2010/0017218 A1* | 1/2010 | Gazetova | G06Q 30/02 705/1.1 |
| 2010/0042622 A1* | 2/2010 | Matkowsky | H04L 29/12594 707/769 |
| 2011/0258237 A1* | 10/2011 | Thomas | G06F 16/90344 707/803 |
| 2011/0276716 A1* | 11/2011 | Coulson | H04L 29/12613 709/238 |
| 2013/0007271 A1 | 1/2013 | Stout et al. | |
| 2015/0120691 A1 | 4/2015 | Blemaster | |
| 2015/0154720 A1* | 6/2015 | Matkowsky | G06Q 50/184 705/310 |
| 2016/0055490 A1 | 2/2016 | Keren et al. | |
| 2018/0063174 A1* | 3/2018 | Grill | H04L 63/164 |
| 2018/0139235 A1* | 5/2018 | Desai | H04L 63/1483 |

OTHER PUBLICATIONS

Kintis et al., "Hiding in Plain Sight: A Longitudinal Study of Combosquatting Abuse", Proceedings of the 2017 ACM SIGSAC Conference on Computer and Communications Security. Aug. 28, 2017. pp. 569-586.

John Toon, "'Combosquatting' Attack Hides in Plain Sight to Trick Computer Users", Research News, Georgia Institute of Technology. Oct. 30, 2017. pp. 1-4.

* cited by examiner

GUIDED WORD ASSOCIATION BASED DOMAIN NAME DETECTION

BACKGROUND

Technical Field

The present invention relates to guided word association based domain name detection. More specifically, the present invention relates to guided determination of associated words effective for domain name detection.

Description of the Related Art

Cyber-squatting refers to the practice of registering names, especially well-known company or brand names, as Internet domains, in the hope of reselling them at a profit.

Combo-squatting is one form of cyber-squatting which includes combining a domain name of a particular brand and a generic keyword to generate a cyber-squatted domain name. For example, "socialmedia.com" may be combined with a keyword, such as friends or popularity, to obtain a domain that is similar to the original, but that can be used to fool or misguide a user. For example, a combo-squatted domain, such as "socialmediafriends.com" or "socialmediapopularity.com" can be generated to fool a user. In this case, even though extra words appear, users may still believe that the domain is owned and or controlled by the same company that owns "socialmedia.com."

It is a challenge for popular brands to know what active/live domains that include their brand name exist in the vast space of public internet. For any given brand with an online presence, it is critical to make sure there are no cyber-squatted domains in existence, which can steal/drive the internet traffic away from the legitimate domains.

Even worse, some of the cyber-squatted domains can host malicious or questionable content which can harm the brand's reputation.

SUMMARY

According to an aspect of the present invention, provided is a computer program product including one or more computer readable storage mediums collectively storing program instructions that are executable by a computer to cause the computer to perform operations including obtaining an original domain name, constructing a feature space from a corpus of text, wherein each word appearing in the corpus is represented as a vector in the feature space, detecting whether a domain name registration exists for each combination of the original domain name and each of a plurality of seed words from the feature space, determining, for each seed word included in an existing domain name registration, a plurality of nearest neighbor candidate words, based on vector distance in the feature space, and repeating, for at least one repetition, the detecting and the determining, wherein the plurality of nearest neighbor candidate words are utilized as the plurality of seed words.

This aspect may also include the method performed by the processor executing the instructions of the computer program product, and an apparatus that performs the method.

The summary clause does not necessarily describe all necessary features of the embodiments of the present invention. The present invention may also be a sub-combination of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

Embodiments of the present invention may seek to obtain knowledge on how combo-squatted domains are generated. Therefore, it is desirable to obtain a method to effectively generate combo-squatted domains that have a high chance to exist.

Combo-squatted domains become registered and removed in a constant cycle. New combo-squatted domains are often similar to previous combo-squatted domains, especially previous combo-squatted domains that have successfully generated a significant amount of traffic.

Knowing this similarity to exist may be useful in guiding the determination of associated words effective for domain name detection.

Some embodiments include a method that utilizes the similarity of words on a defined corpus which can be constructed from multiple data source (e.g., Wikipedia) for semantic context and a feedback mechanism for checking the availability of a generated domain (by DNS query) to guide the generation of combo-squatted domains that are likely to be active/live.

Certain embodiments operate such that a data source is selected for a target domain that will serve as the corpus from which to select the words that will be used for combo-squatting and can be filtered by parameters such as location, time, etc.

From such resulting corpus two things may be computed: i) a feature space, where each word can be represented as a dense vector; and ii) a set of initial "seed" words, by applying a ranking function that can consider frequency (Term Frequency-Inverse Document Frequency or TF-IDF), centrality or topic.

For each of the seed words, a combo-squatted domain may be produced and checked for existence as a registered live domain name. Seed words resulting in existing domains may be kept within the set while seed words resulting in non-existing domains may be added to a "Failed" list.

For each seed word resulting in existing domain, the feature space may be used to capture a set of N neighbor words, by computing the distances between the vectors associated with the words.

From this set of neighbor words, a subset of "candidate" words may be selected by choosing neighbor words that are closer to the successful seed word associated with them, but at the same time most distant, on average, to the seed words in the "Failed" list. In this manner, feedback from failed seed words may be considered to guide the candidate selection.

To avoid possible over-fitting or early convergence, the candidate selection may be performed based on a certain probability p, while a random selection is performed with a probability 1−p.

This resulting set of candidate words may become the new seed words, and the process may start once again.

Figure 1:
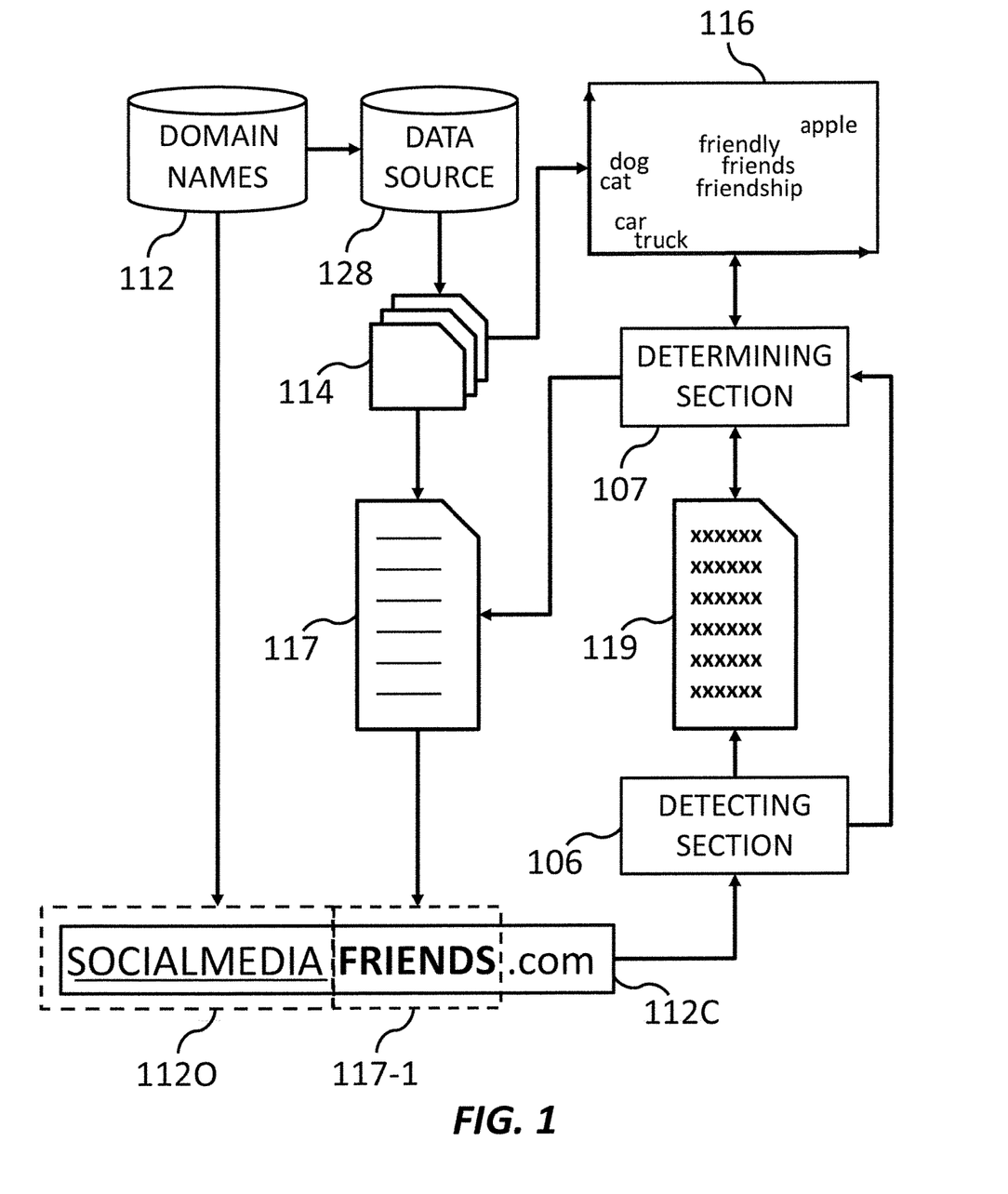
FIG. 1 shows a diagram of guided word association based domain name detection, according to an embodiment of the present invention.

FIG. 1 shows a diagram of guided word association based domain name detection, according to an embodiment of the present invention. In this embodiment, an original domain name 112O is obtained from original domain names of interest 112, and a corresponding corpus of text 114 is obtained from a data source 128. For example, domain name 112O is "SOCIALMEDIA", which may be used with any top level domain such as ".com", ".net", etc. In another example, the domain name may be "FACEBOOK." Data source 128 may be selected based on the domain name, and corpus of text 114 may be a portion of data source 128 conspicuously associated with domain name 112O. For example, data source 128 may be "ONLINESOURCE" and corpus of text 114 may be the entry for "SOCIALMEDIA", the social media service that owns and operates the domain name 112O of "SOCIALMEDIA". In another example, the data source may be "WIKIPEDIA." Alternatively, data source 128 may be "ONLINEPLATFORM" and the corpus of text may be all messages, known as "MESSAGE", that include the word "SOCIALMEDIA". In another example, the data source may be "TWITTER" and the corpus of text may be all messages, known as "TWEETS," that include the word "FACEBOOK". Further specification of time or location may be desired based on the domain name. For example, corpora that include more recently authored text may be more beneficial for domain names associated with trendy, fashionable, or otherwise fast-changing markets. At the same time, corpora that include text authored from Japan may be more beneficial for domain names having popularity limited to Japan. This may be especially true for domain names of languages spoken in limited locations.

From corpus of text 114, a feature space 116 including word vectors may be constructed, and a list of seed words 117 may be captured. All of the unique words of corpus of text 114 may be mapped onto feature space 116, which when represented visually, can depict relative distances of words based on their usage within corpus of text 114. For example, if the words "dog" and "cat" regularly appear within close proximity, then feature space 116 will show them near each other. Likewise, words that never appear in proximity will be shown at a distance in feature space 116. The vector associated with each word is generated such that the relative distance of any two words can be easily calculated. For example, the vector associated with each word may be obtained by a trainable task in which given a target word, it is needed predict its context, where context is defined as the words that appear to the left and to the right of the target word. With this, after iterating over all possible [target word, context] pairs, the vectors are such that they resemble, in their feature space, the distributional similarities between words in a corpus. To ensure that the feature space is not overwhelmed by common words, such as articles (a, the), prepositions (in, on, of), and other words that may frequently appear in text, but have no significant relationship to their surrounding words, these words are excluded from the feature space and vector generation altogether. Such words are commonly known as "stop words", and though "stop words" may vary depending on the application, they are usually simply the most common words in a language. Seed words 117 may be initially captured as simply the words in feature space 116 that appear most frequently within corpus of text 114.

Seed words 117 may be combined with domain names 112 to form potentially combo-squatted domain names. For example, the first seed word 117-1, which may be the most frequently appearing word in corpus of text 114, may be combined with original domain name 112O and a given top level domain to form potentially combo-squatted domain name 112C, "SOCIALMEDIAFRIENDS.com". Although in this example seed word 117-1 has been added to the end of original domain name 112O, seed words may be added to the beginning, and/or multiple seed words can be added to the beginning, end, or both to form potentially combo-squatted domain names. The potentially combo-squatted domain name may also include a connecting character, such as a hyphen, between the original domain name and the seed word. For example, the potentially combo-squatted domain name may be "SOCIALMEDIA-FRIENDS.com".

Contact with this potentially combo-squatted domain name may then be attempted by detecting section 106, to detect whether a response is received. Receiving a response may indicated that the potentially combo-squatted domain has been registered, and can be further reviewed to determine if registration was in bad faith. If a response is received, then detecting section 106 may acknowledge this as a success, and the seed word may be maintained for further processing. If a response is not received, then detecting section 106 may acknowledge this as a failure, and the seed word may be added to a list of failed words 119.

For successful seed words, similar words may be determined based on vector distance within feature space 116 by a determining section, such as determining section 107. For example, for a given successful seed word, words in the feature space having a short vector distance from the successful seed word may be captured as candidate words. In some embodiments, candidate words may be disqualified if the candidate word also has a short vector distance from a failed word 119. Even in such embodiments, candidate words that would otherwise be disqualified may be preserved every so often, so as to prevent over-fitting, and maintain some balance of exploration vs exploitation.

Candidate words will then become seed words for the next round of detection. Detection of potentially combo-squatted domain names is then followed by another round of candidate word determination. Repetitions of detection and determination may proceed until certain criteria are met. For example, detection and determination can be repeated until a designated number of registered domain names have been detected, a designated total amount of time has passed, a designated amount of attempts since detection of the last registered domain name was detected, etc.

Figure 2:
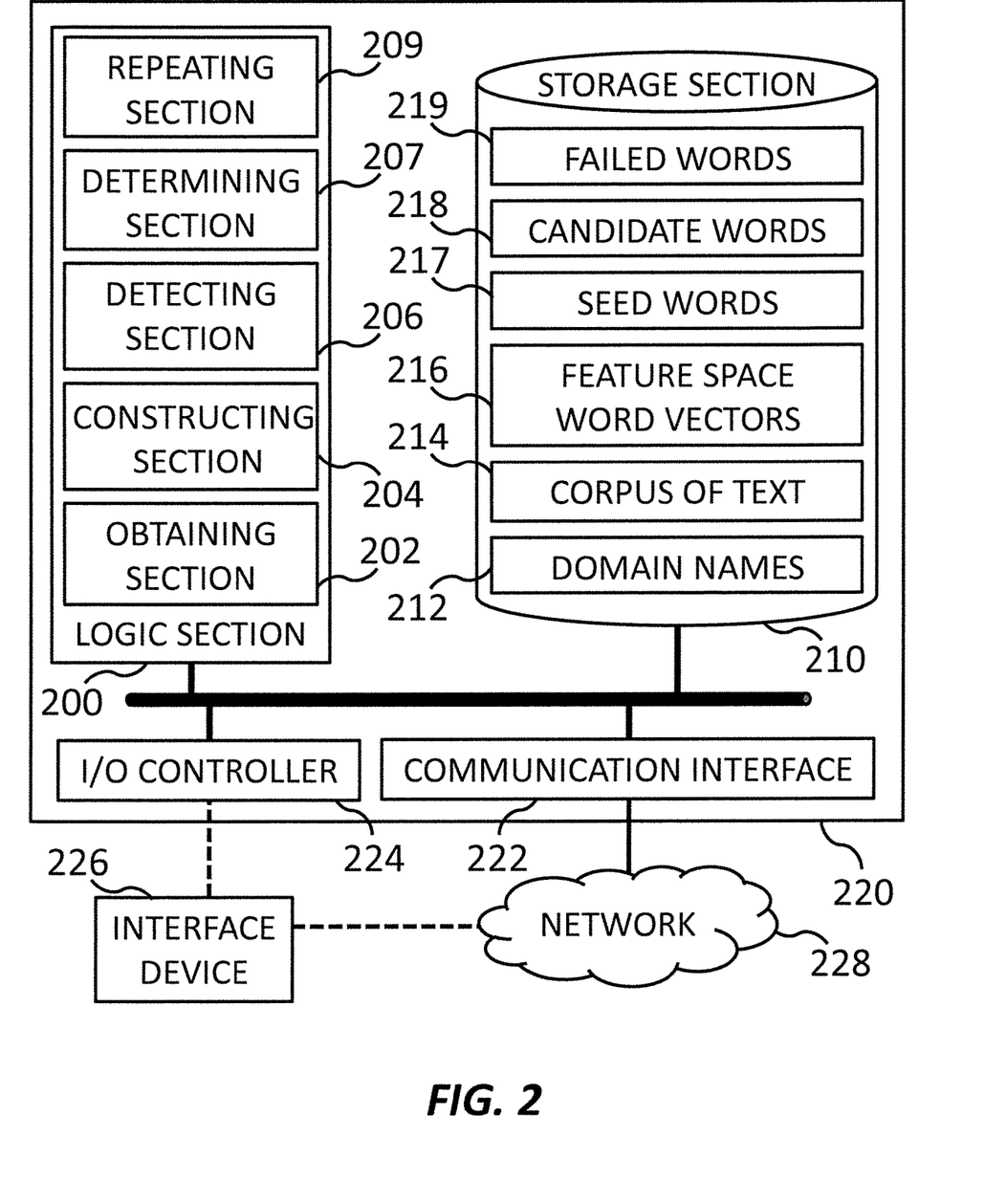
FIG. 2 shows an exemplary hardware configuration for guided word association based domain name detection, according to an embodiment of the present invention.

FIG. 2 shows an exemplary hardware configuration for guided word association based domain name detection, according to an embodiment of the present invention. The exemplary hardware configuration includes apparatus 220, which communicates with network 228, and interacts with an interface device 226. Apparatus 220 may be a host computer such as a server computer or a mainframe computer that executes an on-premise application and hosts client computers that use it, in which case apparatus 220 may not be directly connected to interface device 226, but are connected through a terminal device through network 228. Apparatus 220 may be a computer system that includes two or more computers. Apparatus 220 may be a personal computer that executes an application for a user of apparatus 220.

Apparatus 220 includes a logic section 200, a storage section 210, a communication interface 222, and an input/output controller 224. Logic section 200 may be a computer program product including one or more computer readable storage mediums collectively storing program instructions that are executable by a processor or programmable circuitry to cause the processor or programmable circuitry to perform the operations of the various sections. Logic section 200 may alternatively be analog or digital programmable circuitry, or any combination thereof. Logic section 200 may be composed of physically separated storage or circuitry that interacts through communication. Storage section 210 may be a non-volatile computer-readable medium capable of storing non-executable data for access by logic section 200 during performance of the processes herein. Communication interface 222 reads transmission data, which may be stored on a transmission buffering region provided in a recording medium, such as storage section 210, and transmits the read transmission data to network 228 or writes reception data received from network 228 to a reception buffering region provided on the recording medium. Input/output controller 224 connects to various input and output units, such as interface device 226, via a parallel port, a serial port, a keyboard port, a mouse port, a monitor port, and the like to accept commands and present information.

Logic section 200 includes obtaining section 202, constructing section 204, detecting section 206, determining section 207, and repeating section 209. Storage section 210 includes domain names 212, corpus of text 214, feature space word vectors 216, seed words 217, candidate words 218, and failed words 219.

Obtaining section 202 is the portion of logic section 200 that performs obtaining data from storage section 210 and network 228, in the course of guided word association based domain name detection. Obtaining section 202 may include sub-sections for performing additional functions, as described in the flow charts below. Such sub-sections may be referred to by a name associated with their function.

Constructing section 204 is the portion of logic section 200 that constructs a feature space of word vectors from a corpus of text in the course of guided word association based domain name detection. In doing so, constructing section 204 may map feature vectors of unique words in a corpus of text, which may be stored in feature space word vectors 216. Constructing section 204 may include sub-sections for performing additional functions, as described in the flow charts below. Such sub-sections may be referred to by a name associated with their function.

Detecting section 206 is the portion of logic section 200 that detects domain registration of combinations of an original domain name with associated words, in the course of guided word association based domain name detection. For example, the detecting section may attempt contact with a combination as a domain name and detect whether a response is received. Detecting section 206 may read associated words from seed words 217 and candidate words 218, and may further add any associated words to failed words 219 when, for example, no response is received. Detecting section 206 may include sub-sections for performing additional functions, as described in the flow charts below. Such sub-sections may be referred to by a name associated with their function.

Determining section 207 is the portion of logic section 200 that determines candidate words based on the results of detecting section 206 in the course of guided word association based domain name detection. In doing so, determining section 207 may utilize the feature space to capture similar words to successful seed words based on vector distance. Determining section 207 may include sub-sections for performing additional functions, as described in the flow charts below. Such sub-sections may be referred to by a name associated with their function.

In other embodiments, the apparatus may be any other device capable of processing logical functions in order to perform the processes herein. The interface device may be any device capable of conveying information to a user from the apparatus, and accepting user input to the apparatus, such as original domain names and corpus of text to perform guided word association based domain name detection. The apparatus may not need to be connected to a network in environments where the input, output, and all information is directly connected. The logic section and the storage section need not be entirely separate devices, but may share one or more computer-readable mediums. For example, the storage section may be a hard drive storing both the computer-executable instructions and the data accessed by the logic section, and the logic section may be a combination of a central processing unit (CPU) and random access memory (RAM), in which the computer-executable instructions may be copied in whole or in part for execution by the CPU during performance of the processes herein.

In embodiments where the apparatus is a computer, a program that is installed in the computer can cause the computer to function as or perform operations associated with apparatuses of the embodiments of the present invention or one or more sections (including modules, components, elements, etc.) thereof, and/or cause the computer to perform processes of the embodiments of the present invention or steps thereof. Such a program may be executed by a processor to cause the computer to perform certain operations associated with some or all of the blocks of flowcharts and block diagrams described herein.

Figure 3:
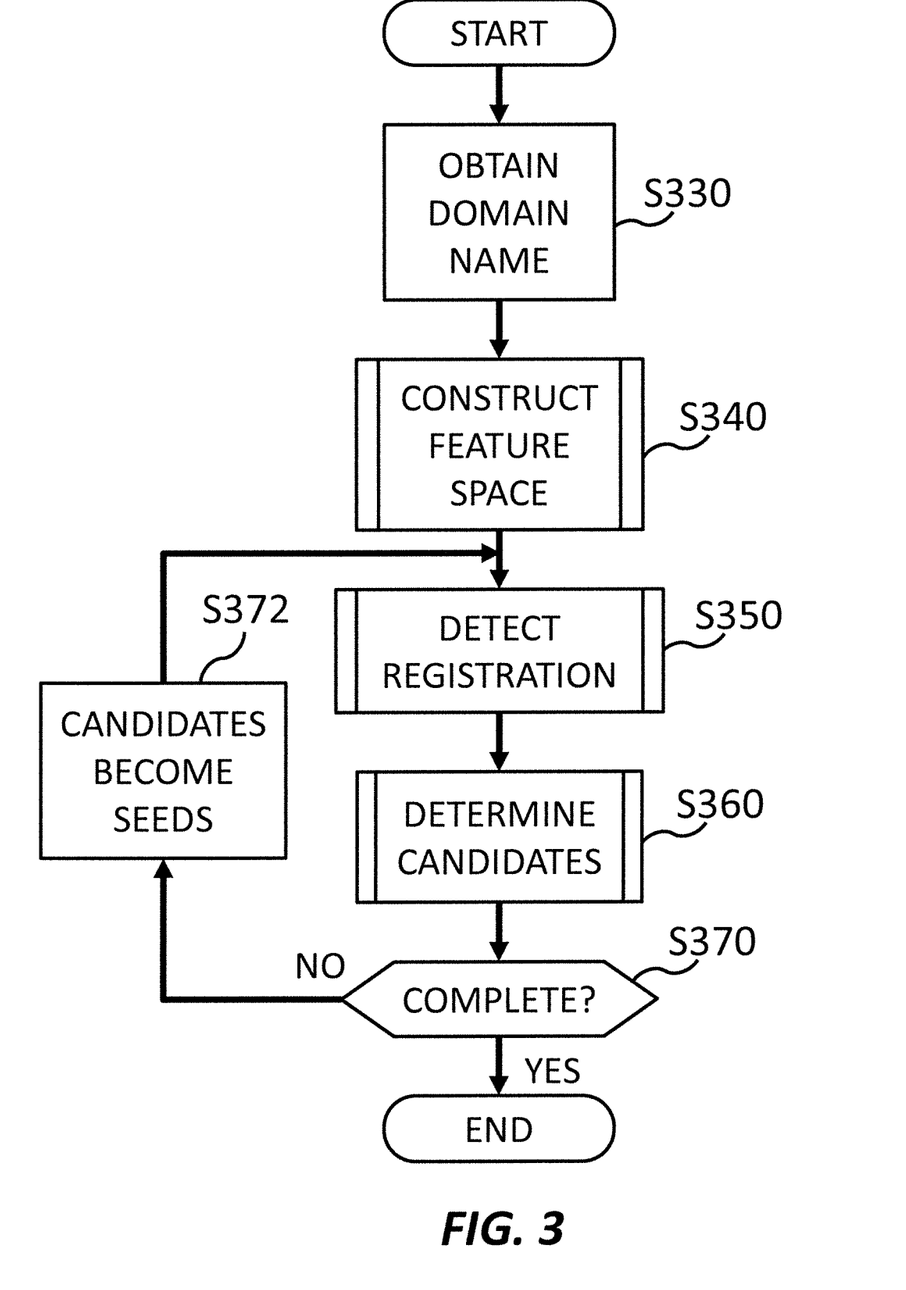
FIG. 3 shows an operational flow for guided word association based domain name detection, according to an embodiment of the present invention.

FIG. 3 shows an operational flow for guided word association based domain name detection, according to an embodiment of the present invention. The operational flow may provide a method of guided word association based domain name detection. The operations within this operational flow may be performed by an apparatus, such as apparatus 220.

At S330, an obtaining section, such as obtaining section 202, obtains an original domain name. For example, the obtaining section may obtain an original domain name from a database of domain names of interest, from direct user input, such as through interface device 226, or from another source through a network, such as network 228. The obtaining section may also obtain a corpus of text from interface device 226, or from another source through a network, such as network 228. The obtaining section may store the domain name in domain names 212, within storage section 210, if not already stored. The obtaining section may also store the corpus of text in corpus of text 214, within storage section 210, if not already stored.

At S340, a constructing section, such as constructing section 204, constructs a feature space of unique words from a corpus of text. For example, the constructing section may generate word vectors for each unique word from the corpus of text, each word vector establishing the relative distance from the word to other words. In other words, the constructing section may construct a feature space from a corpus of text, wherein each word appearing in the corpus is represented as a vector in the feature space. The constructing section may store the feature space and word vectors in feature space word vectors 216, within storage section 210.

At S350, a detecting section, such as detecting section 206, detects registration of domain names. For example, the detecting section may detect whether one or more potentially combo-squatted domain names exist. The detecting section may communicate with one or more domain name service (DNS) resolvers, domain name registrars, or any other entity capable of directing traffic to different servers across a wide area network by matching domain names with digital addresses. The detecting section may be in direct connection to such entities, but is more likely in communication through a network, such as network 228. The detecting section may interact with seed words 217 or candidate words 218 to prepare potentially combo-squatted domain names by combining seed words and candidate words with an original domain name. In other words, the detecting section may detect whether a domain name registration exists for each combination of the original domain name and each of a plurality of seed words from the feature space. The detecting section may store any seed words or candidate words included in a non-existent potentially combo-squatted domain name to failed words 219, within storage section 210.

At 360, a determining section, such as determining section 360, determines candidate words from seed words included in existent potentially combo-squatted domain names. For example, the determining section may determine which words in the feature space have the strongest association with the successful seed words. The determining section may calculated the vector distance between a successful seed word and other words in the feature space, since a strong association may be exhibited by a short vector distance between a successful seed word and a candidate word. In other words, the determining section may determine, for each seed word included in an existing domain name registration, a plurality of nearest neighbor candidate words, based on vector distance in the feature space. The determining section may also disqualify candidate words that also have a strong association with a failed word. The determining section may store any candidate words in candidate words 218, within storage section 210.

At S370, a repeating section, such as repeating section 209, determines whether to repeat the detection and determination, or whether the process is complete. For example, the repeating section causes detection and determination to repeat until a designated number of registered domain names have been detected, a designated total amount of time has passed, a designated amount of attempts since detection of the last registered domain name was detected, etc. In other words, the repeating section may repeat, for at least one repetition, the detecting and the determining, wherein the plurality of nearest neighbor candidate words are utilized as the plurality of seed words. In embodiments in which the determining section also disqualifies candidate words, the repeating further includes the disqualifying. If any completion criterion has not been met, then the operational flow proceeds to S372, where the repeating section establishes any candidate words determined at S360 as seed words before returning to S350, where another round of detecting and determination are performed utilizing the newly established seed words. If the completion criterion has been met, then the operational flow ends.

Figure 4:
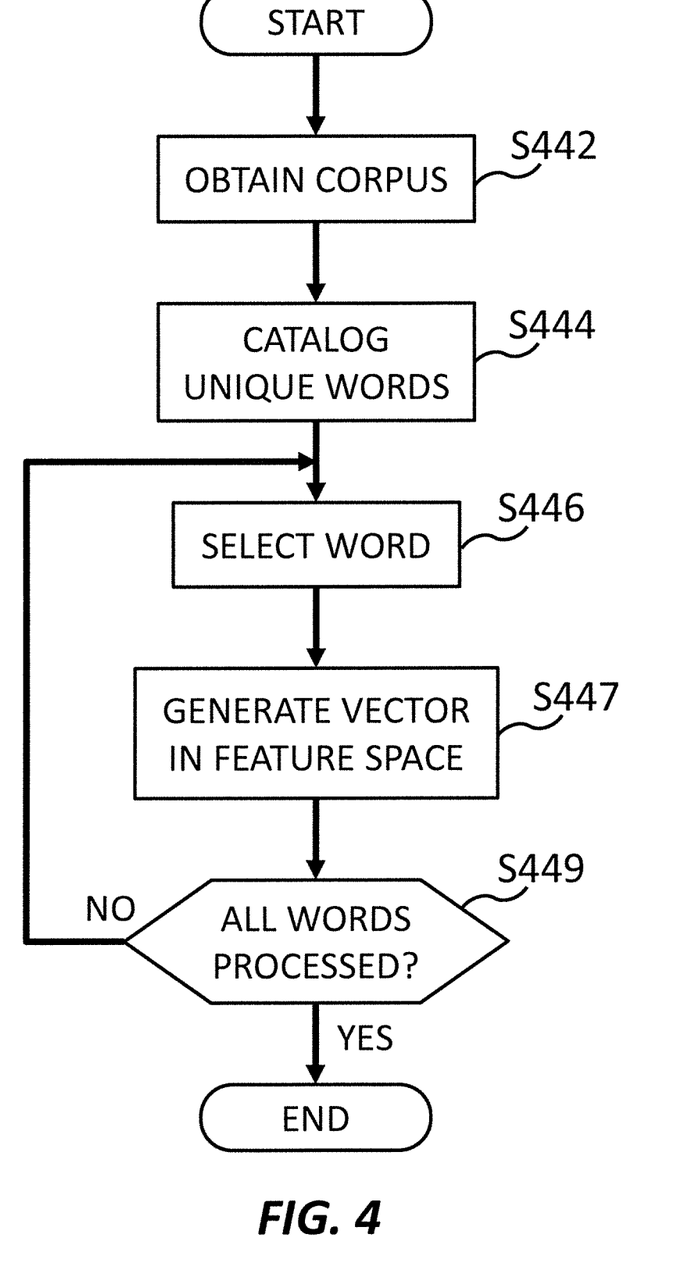
FIG. 4 shows an operational flow for constructing a feature space, according to an embodiment of the present invention.

FIG. 4 shows an operational flow for constructing a feature space, such as S340 in FIG. 3, according to an embodiment of the present invention. The operations within this operational flow may be performed by a constructing section, such as constructing section 204, or a correspondingly named sub-section thereof. As described in FIG. 3, original domain names and a corpus of text may be obtained prior to construction of the feature space.

At S442, a corpus obtaining section, such as constructing section 204 or a sub-section thereof, obtains a corpus of text. For example, the corpus obtaining section may obtain the corpus of text from a storage section, such as corpus of text 214, stored in storage section 210. In cases where a corpus of text has not been stored in the storage section, the corpus obtaining section may cause an obtaining section, such as obtaining section 202, to obtain a corpus of text from interface device 226, or from another source through a network, such as network 228. In some embodiments, the corpus obtaining section may select a corpus of text according to one of location and time.

At S444, a cataloging section, such as constructing section 204 or a sub-section thereof, catalogs unique words included in the corpus of text. For example, the cataloging section makes a list of words as the corpus text is reviewed, and each time a new word is read, that word is added to the list. In other words, the constructing includes cataloging the unique words in the corpus. Articles (a, the), prepositions (in, on, of), and other words that may frequently appear in text, but have no significant relationship to their surrounding words, may be excluded from the list. Cataloging section may also track the frequency of each unique word as the corpus of text is reviewed. Once review of the corpus of text is completed, and all of the unique words have been added to the list, the cataloging section may list the most frequently appearing words as an initial list of seed words. In some embodiments, the cataloging section may also list training data pairs, each training data pair including an instance of a unique word and its context, the context being the words to the left and right of the instance of the unique word. A training data pair may be listed for each instance of all unique words in the corpus of text. The cataloging section may store the initial list of seed words in seed words 217, within storage section 210. In other words, prior to the repeating, the plurality of seed words include words from the corpus that appear most frequently.

At S446, a word selecting section, such as constructing section 204 or a sub-section thereof, selects a word among the list of unique words cataloged at S444. As iterations of the operational flow for constructing a feature space proceed, only previously unselected unique words may be selected at S446, to ensure that a word vector is generated for each unique word.

At S447, a vector generating section, such as constructing section 204 or a sub-section thereof, generates a word vector in the feature space for the unique word selected at S446. In other words, the constructing includes generating a vector for each unique word in the feature space. The word vector may be generated such that the relative distance of any two words can be easily calculated. In other words, the word vector may be generated in consideration of all other unique words. In some embodiments, the word vector may be obtained by a training a learning process in which a unique word is input, and the output of the learning process is compared with the context of each training data pair including the input unique word. In other words, the context of the unique word is predicted. In such embodiments, after iterating over all possible training data pairs, the word vectors are such that they resemble, in their feature space, the distributional similarities between words in the corpus of text. The vectoring generating section may store word vectors in feature space word vectors 216, within storage section 210.

At S449, a constructing section, such as constructing section 204, determines whether all of the unique words cataloged at S444 have been processed by the vector generating section. If any words remain unprocessed, then the operational flow returns to S446, where another word is selected for processing. If no words remain unprocessed, then the operational flow for constructing a feature space is complete.

Figure 5:
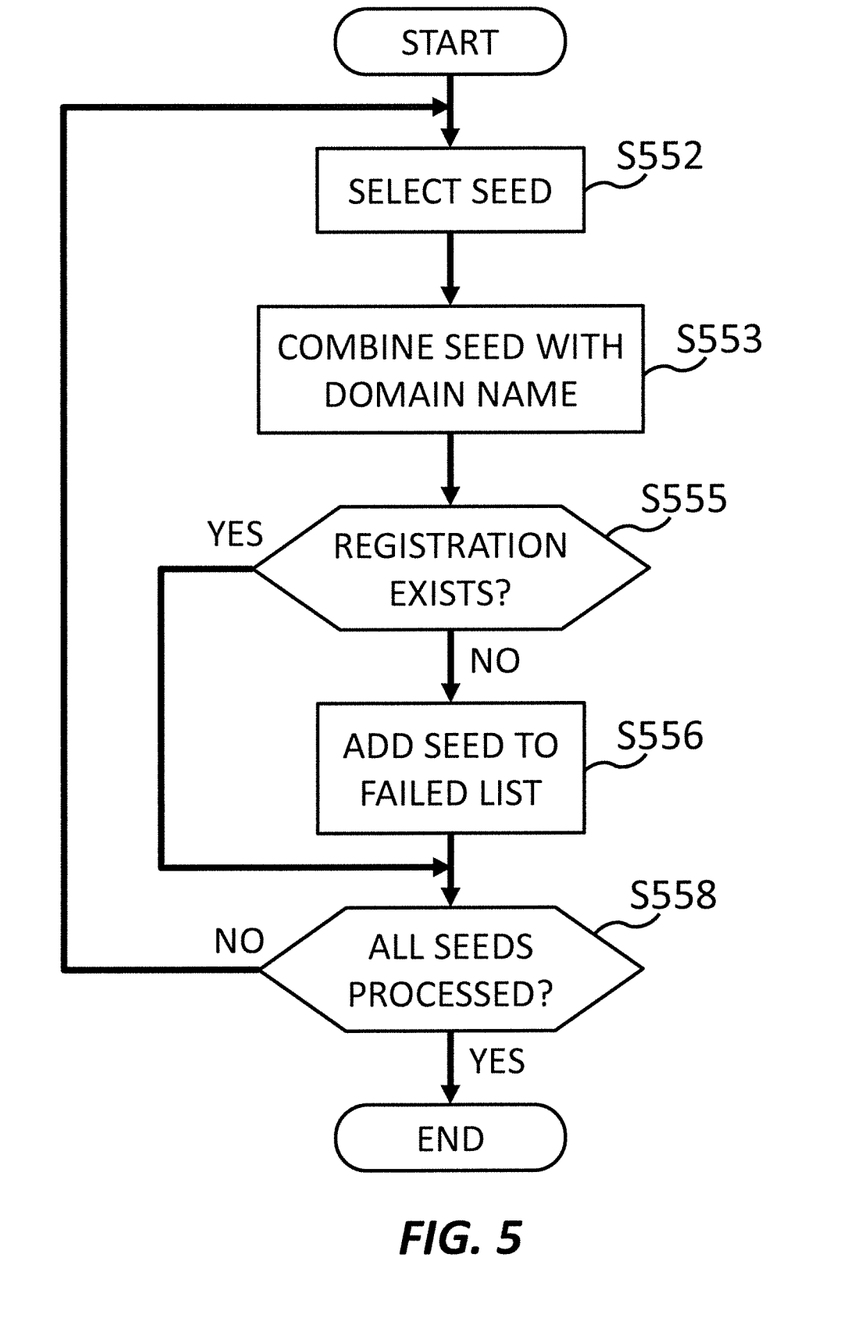
FIG. 5 shows an operational flow for detecting domain name registration for combinations of an original domain name and associate words, according to an embodiment of the present invention.

FIG. 5 shows an operational flow for detecting domain name registration for combinations of an original domain name and associate words, such as S350 of FIG. 3, according to an embodiment of the present invention. The operations within this operational flow may be performed by a detecting section, such as detecting section 206, or a correspondingly named sub-section thereof. As described in FIG. 4, seed words may be listed and stored prior to detecting domain name registration.

At S552, a seed selecting section, such as detecting section 206 or a sub-section thereof, selects a seed word among a list of seed words. For example, seed selecting section may select a seed word stored in seed words 217, within storage section 210. As iterations of the operational flow for detecting domain name registration proceed, only previously unselected seed words may be selected at S552, to ensure that each seed word is combined with the original domain name.

At S553, a combining section, such as detecting section 206 or a sub-section thereof, combines the original domain name with the seed word selected at S552. For example, the combining section may combine the seed word selected at S552 with the original domain name and a given top level domain to form potentially combo-squatted domain name. The combining section may add the seed word to the beginning or to the end to form the potentially combo-squatted domain name. The combining section may also include a connecting character, such as a hyphen, between the original domain name and the seed word. In other words, each combination of the original domain name and each of the plurality of seed words is one of a combination in which the seed word follows the original domain name and a combination in which the seed word precedes the original domain name. The top level domain may be the same for each iteration of S553.

At S555, the detecting section detects whether registration of the potentially combo-squatted domain name exists. For example, the detecting section may send a request to one or more DNS resolvers, domain name registrars, etc., the request including the potentially combo-squatted domain name. The detecting section may not receive a response immediately, and therefore may wait for a designated period of time for a response. If the detecting section does not receive a response, or does not receive a response within the designated amount of time, then the detecting section proceeds to S556, where the detecting section adds the seed selected at S552 to the failed list, such as failed list 219, within storage section 210. If the detecting section does receive a response, then the detecting section proceeds to S558.

At S558, the detecting section determines whether all of the seed words have been processed by the detecting section. For example, the detecting section may determine whether all of the seed words stored in seed words 217, within storage section 210, have been processed. If any seed words remain unprocessed, then the operational flow returns to S552, where another seed word is selected for processing. If no seed words remain unprocessed, then the operational flow for detecting domain name registration is complete.

Figure 6:
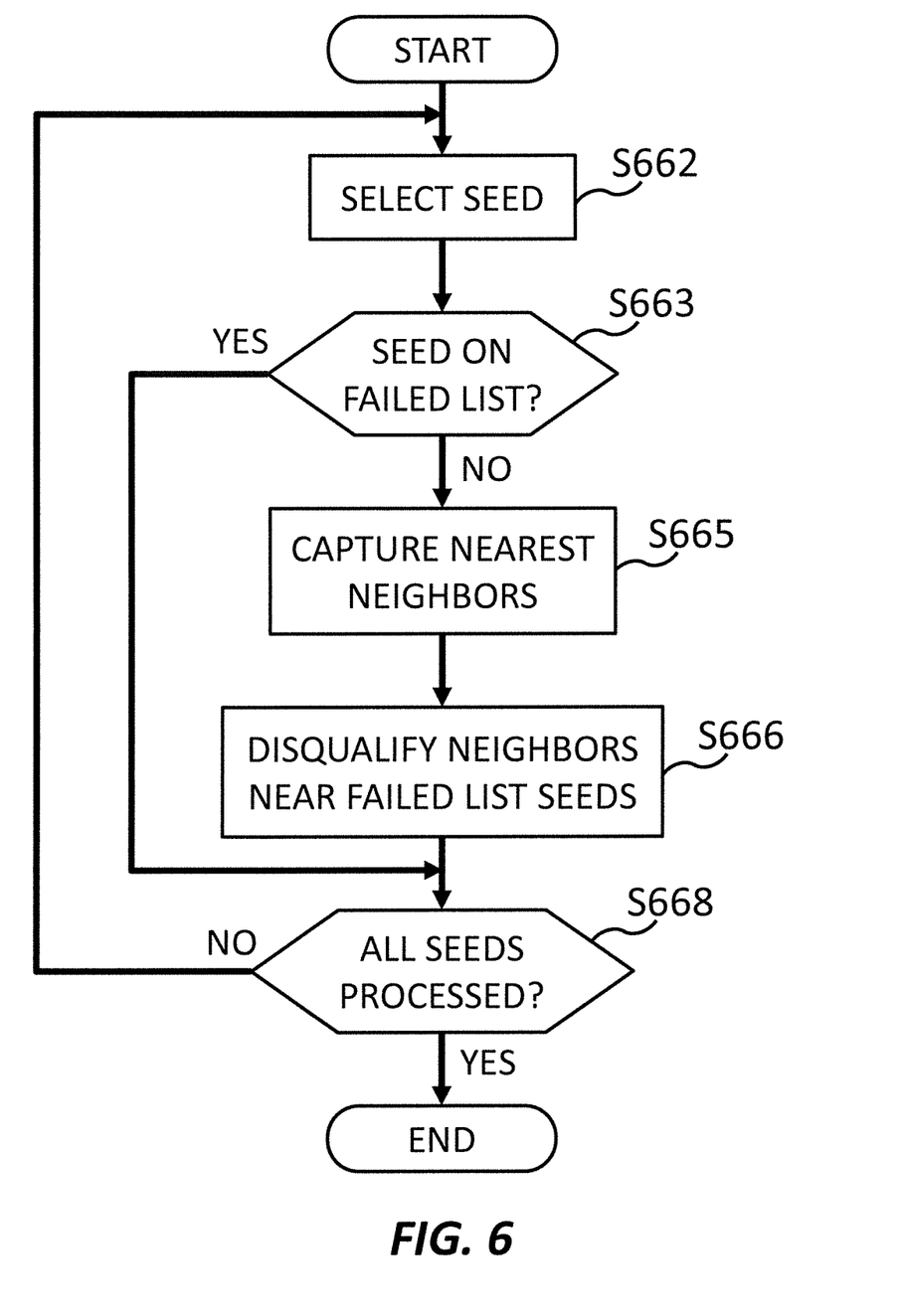
FIG. 6 shows an operational flow for determining nearest neighbor candidate words, according to an embodiment of the present invention.

FIG. 6 shows an operational flow for determining nearest neighbor candidate words, such as S360 of FIG. 3, according to an embodiment of the present invention. The operations within this operational flow may be performed by a determining section, such as determining section 207, or a correspondingly named sub-section thereof. As described in FIG. 5, seed words may be added to a failed list and stored prior to determining candidate words.

At S662, a seed selecting section, such as determining section 207 or a sub-section thereof, selects a seed word among seed words. At S663, the seed selecting section verifies whether the seed word selected at S662 was successful. For example, seed selecting section may select a seed word remaining stored in seed words 217, within storage section 210, or otherwise indicated as being included in an existing potentially combo-squatted domain name. If a seed word is included in a failed seed list, such as failed seeds 219, then the operational flow proceeds to S668, skipping further processing of the seed word. If a seed word is not included in the failed seed list, then the operational flow proceeds to S665. As iterations of the operational flow for determining candidate words proceed, only previously unselected seed words may be selected at S662 and only successful seed words are allowed to proceed to further processing at S663, to ensure that candidates associated with each successful seed are determined.

At S665, a capturing section, such as determining section 208 or a sub-section thereof, captures words within a feature space that are associated with the successful seed word selected at S662. For example, the capturing section may process the word vectors in the feature space, such as the word vectors in feature space word vectors 216, to determine which words in the feature space have the shortest vector distance from the successful seed word. The capturing section may capture all words within a designated distance of the successful seed word, may capture a designated number of the closest words, etc. The capturing section may store the captured words in candidate words 218, within storage section 210.

At S666, a disqualifying section, such as determining section 208 or a sub-section thereof, disqualifies any words captured at S665 that are associated with any failed seed words. For example, the disqualifying section may disqualify any candidate words within a designated vector distance from a seed word included in a failed seed list, such as failed seeds 219. In other words, the disqualifying section may disqualify, from the plurality of nearest neighbor candidate words of each seed word included in an existing domain name registration, each candidate word having a vector distance within a threshold distance of any seed word included in a non-existent domain name registration. In this manner, feedback from failed seed words may be considered to guide the candidate qualification. In some embodiments, disqualifying section may not disqualify a candidate word that would otherwise be disqualified every so often, so as to prevent over-fitting, and maintain some balance of exploration vs exploitation. More specifically in such embodiments, the disqualifying includes maintaining, as a candidate word, every nth candidate word having a vector distance within a threshold distance of any seed word included in a non-existent domain name registration.

At S668, the determining section determines whether all of the seed words have been processed by the determining section. For example, the determining section may determine whether all of the seed words stored in seed words 217, within storage section 210, have been processed, or at least all of the successful seed words. If any successful seed words remain unprocessed, then the operational flow returns to S662, where another seed word is selected for processing. If no successful seed words remain unprocessed, then the operational flow for determining candidate words is complete.

When compared with traditional methods of potentially combo-squatted domain name detection, such as when using a fixed dictionary of words to combine with an original domain, embodiments of the present invention may more precisely detect existing potentially combo-squatted domain names. In testing, some embodiments of the present invention have shown a higher success rate compared with traditional potentially combo-squatted domain name detection techniques, even without candidate guidance from failed seed words. Embodiments in which candidate selection is guided by failed seed words have shown even higher success rates. Depending on the original domain name and the data source, time and location limitations on the corpus of text may also yield higher success rates.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer program product including one or more computer readable storage mediums collectively storing program instructions that are executable by a computer to cause the computer to perform operations comprising:
    obtaining an original domain name;
    constructing a feature space from a corpus of text, wherein each word appearing in the corpus is represented as a vector in the feature space;
    detecting whether a domain name registration exists for each combination of the original domain name and each of a plurality of seed words from the feature space;
    determining, for each seed word included in an existing domain name registration, a plurality of nearest neighbor candidate words, based on vector distance in the feature space; and
    repeating, for at least one repetition, the detecting and the determining, wherein the plurality of nearest neighbor candidate words are utilized as the plurality of seed words.

2. The computer program product of claim 1, further comprising
    disqualifying, from the plurality of nearest neighbor candidate words of each seed word included in an existing domain name registration, each candidate word having a vector distance within a threshold distance of any seed word included in a non-existent domain name registration;
    wherein the repeating further includes the disqualifying.

3. The computer program product of claim 2, wherein the disqualifying includes maintaining, as a candidate word, every nth candidate word having a vector distance within a threshold distance of any seed word included in a non-existent domain name registration.

4. The computer program product of claim 1, wherein prior to the repeating, the plurality of seed words include words from the corpus that appear most frequently.

5. The computer program product of claim 1, wherein each combination of the original domain name and each of the plurality of seed words is one of a combination in which the seed word follows the original domain name and a combination in which the seed word precedes the original domain name.

6. The computer program product of claim 1, wherein the constructing includes
    cataloging the unique words in the corpus, and
    generating a vector for each unique word in the feature space.

7. The computer program product of claim 1, further comprising selecting a corpus of text according to one of location and time.

8. A computer-implemented method comprising:
    obtaining an original domain name;
    constructing a feature space from a corpus of text, wherein each word appearing in the corpus is represented as a vector in the feature space;
    detecting whether a domain name registration exists for each combination of the original domain name and each of a plurality of seed words from the feature space;
    determining, for each seed word included in an existing domain name registration, a plurality of nearest neighbor candidate words, based on vector distance in the feature space; and
    repeating, for at least one repetition, the detecting and the determining, wherein the plurality of nearest neighbor candidate words are utilized as the plurality of seed words.

9. The computer-implemented method of claim 8, further comprising disqualifying, from the plurality of nearest neighbor candidate words of each seed word included in an existing domain name registration, each candidate word having a vector distance within a threshold distance of any seed word included in a non-existent domain name registration;
    wherein the repeating further includes the disqualifying.

10. The computer-implemented method of claim 9, wherein the disqualifying includes maintaining, as a candidate word, every nth candidate word having a vector distance within a threshold distance of any seed word included in a non-existent domain name registration.

11. The computer-implemented method of claim 8, wherein prior to the repeating, the plurality of seed words include words from the corpus that appear most frequently.

12. The computer-implemented method of claim 8, wherein each combination of the original domain name and each of the plurality of seed words is one of a combination in which the seed word follows the original domain name and a combination in which the seed word precedes the original domain name.

13. The computer-implemented method of claim 8, wherein the constructing includes
cataloging the unique words in the corpus, and
generating a vector for each unique word in the feature space.

14. The computer-implemented method of claim 8, further comprising selecting a corpus of text according to one of location and time.

15. An apparatus comprising:
an obtaining section configured to obtain an original domain name;
a constructing section configured to construct a feature space from a corpus of text, wherein each word appearing in the corpus is represented as a vector in the feature space;
a detecting section configured to detect whether a domain name registration exists for each combination of the original domain name and each of a plurality of seed words from the feature space;
a determining section configured to determine, for each seed word included in an existing domain name registration, a plurality of nearest neighbor candidate words, based on vector distance in the feature space; and
a repeating section configured to cause the detecting section and the determining section to repeat, for at least one repetition, their respective functions utilizing the plurality of nearest neighbor candidate words as the plurality of seed words,
wherein the obtaining, constructing, detecting, determining, and repeating sections are implemented by a memory device for storing program code and a hardware processor for executing the program code.

16. The apparatus of claim 15, further comprising a disqualifying section configured to disqualify, from the plurality of nearest neighbor candidate words of each seed word included in an existing domain name registration, each candidate word having a vector distance within a threshold distance of any seed word included in a non-existent domain name registration;
wherein the repeating section further causes the disqualifying section to repeat its function.

17. The apparatus of claim 16, wherein the disqualifying section includes a maintaining section configured to maintain, as a candidate word, every nth candidate word having a vector distance within a threshold distance of any seed word included in a non-existent domain name registration.

18. The apparatus of claim 15, wherein prior to the repeating section causing the detecting section and the determining section to repeat, the plurality of seed words include words from the corpus that appear most frequently.

19. The apparatus of claim 15, wherein each combination of the original domain name and each of the plurality of seed words is one of a combination in which the seed word follows the original domain name and a combination in which the seed word precedes the original domain name.

20. The apparatus of claim 15, wherein the constructing includes
a cataloging section configured to catalog the unique words in the corpus, and
generating section configure to generate a vector for each unique word in the feature space.

* * * * *